United States Patent [19]

Saito et al.

[11] Patent Number: 4,489,409
[45] Date of Patent: Dec. 18, 1984

[54] SIGNAL PICKUP DEVICE FOR DISC REPRODUCERS

[75] Inventors: Takashi Saito, Ayase; Tatsuya Miki; Takashi Kumaki, both of Sagamihara, all of Japan

[73] Assignee: Victor Company of Japan, Ltd., Yokohama, Japan

[21] Appl. No.: 436,885

[22] Filed: Oct. 26, 1982

[30] Foreign Application Priority Data

Oct. 28, 1981 [JP] Japan .................. 56-160503[U]

[51] Int. Cl.³ .................. G11B 9/06; G11B 21/24
[52] U.S. Cl. .................. 369/126; 369/170
[58] Field of Search .............. 369/126, 170, 171, 172, 369/138, 139

[56] References Cited

U.S. PATENT DOCUMENTS

| 4,360,909 | 11/1982 | Tajima | 369/170 |
| 4,410,976 | 10/1983 | Uchida et al. | 369/170 |
| 4,413,334 | 11/1983 | Goto | 369/126 |

Primary Examiner—Donald E. McElheny, Jr.
Attorney, Agent, or Firm—Pollock, Vande Sande & Priddy

[57] ABSTRACT

A signal pickup device for an apparatus for playing back an information storage medium such as a video disc comprises a cartridge casing mounted in a signal pickup device body, and a pickup cartridge housed in the cartridge casing and having a reproducing stylus for picking up signals from the video disc, a cantilever assembly composed of a cantilever supporting on one end thereof the reproducing stylus and a suspension member mounted on an opposite end of the cantilever, and a holder supporting the suspension member and attached to the cartridge casing for pivotable movement about the suspension member. The signal pickup device also has a coil through which a current passes for magnetically enabling the reproducing stylus to impose a stylus force on the video disc. The holder can be adjusted in angular position through the pivotable movement about the suspension member to adjust the stylus force. The holder is bonded to the cartridge casing after the holder has been positionally adjusted with respect to the cartridge casing.

8 Claims, 9 Drawing Figures

SIGNAL PICKUP DEVICE FOR DISC REPRODUCERS

BACKGROUND OF THE INVENTION

The present invention relates to a signal pickup device for use in an apparatus for playing back rotatable information storage mediums such as video discs.

There is known a signal pickup device for detecting signals recorded on a video disc as changes in electrostatic capacitance. The conventional signal pickup device comprises a pickup cartridge including a cantilever having a reproducing stylus on its distal end and a cartridge casing in which the cantilever is mounted, the pickup cartridge being mounted in a signal pickup device body. The cantilever has a suspension member attached to a proximal end thereof and composed of a pair of lateral arms fitted fixedly in slots, respectively, in the cartridge casing. During a playback mode of operation, the reproducing stylus is held against the video disc with a fixed stylus force which is determined at the time of assembly of the cartridge. Such a stylus force varies from cartridge to cartridge, a fact which is particularly disadvantageous when replacing one reproducing stylus with another.

SUMMARY OF THE INVENTION

It is an object of the present invention to provide a signal pickup device having a stylus-supporting cantilever fixed by a suspension member to a holder which is angularly movably mounted in a cartridge casing for adjusting the cantilever to produce a desired stylus force.

According to the present invention, there is provided a signal pickup device for an apparatus for playing back an information storage medium such as a video disc, comprising a body, a cartridge casing mounted in the body, a pickup cartridge housed in the cartridge casing and having a reproducing stylus for picking up signals from the information storage medium, a cantilever assembly composed of a cantilever supporting on one end thereof the reproducing stylus and a suspension member mounted on an opposite end of the cantilever, and a holder supporting the suspension member and attached to the cartridge casing for pivotable movement about the suspension member, and means in the body for enabling the reproducing stylus to impose a stylus force on the information storage medium, whereby the holder can be adjusted in angular position through the pivotable movement about the suspension member to adjust the stylus force. The holder is bonded to the cartridge casing after the holder has been positionally adjusted with respect to the cartridge casing.

BRIEF DESCRIPTION OF THE DRAWINGS

The present invention will be described in detail by way of illustrative example with reference to the accompanying drawings, in which.

DETAILED DESCRIPTION

Figure 1:
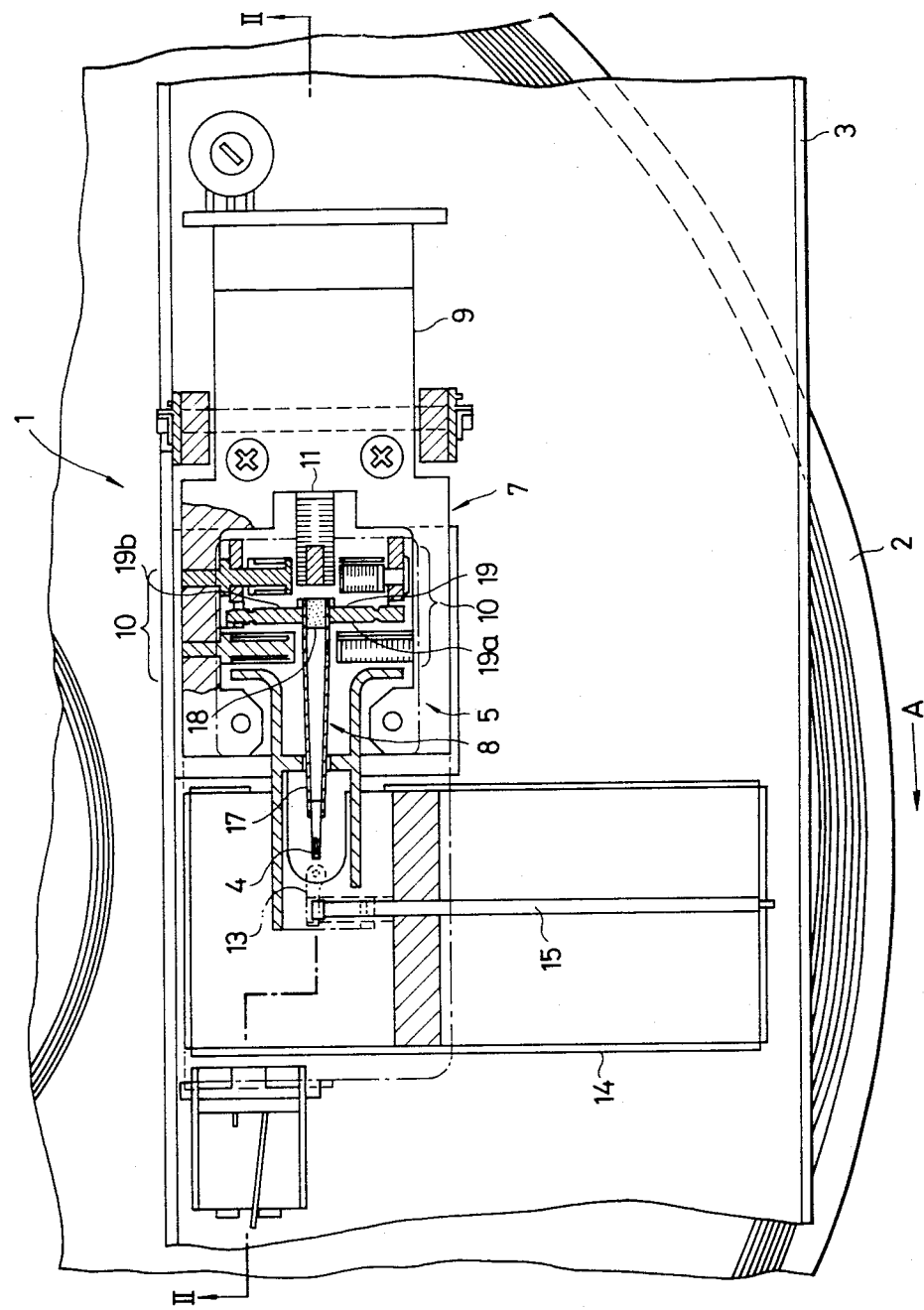
FIG. 1 is a fragmentary plan view, partly in cross section, of a signal pickup device according to the present invention, the view showing the signal pickup device as it plays back a disc.
Figure 2:
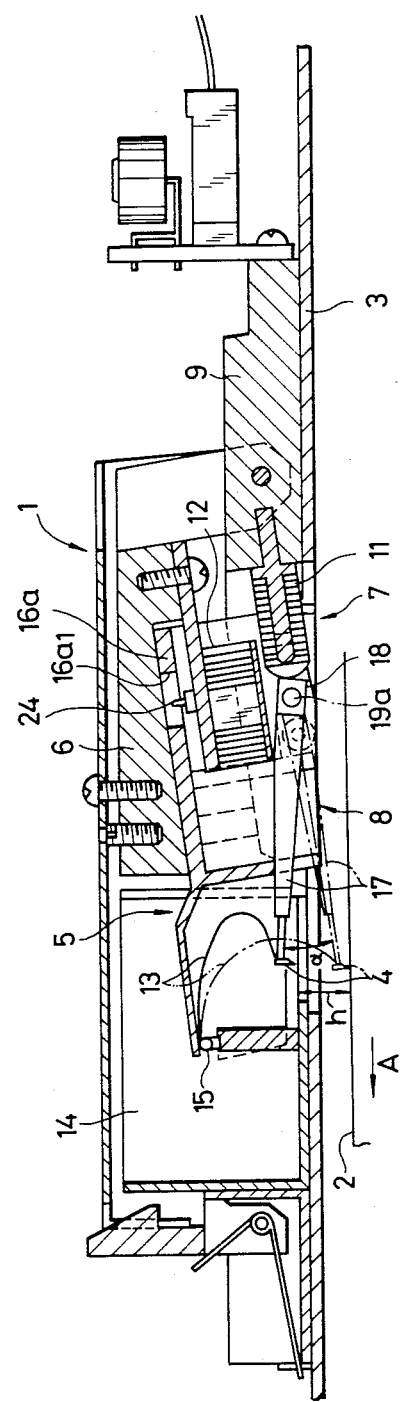
FIG. 2 is a cross-sectional view taken along line II—II of FIG. 1.

As shown in FIGS. 1 and 2, a signal pickup device 1 according to the present invention is mounted in a housing 3 positioned over an information storage medium 2 such as a video disc placed in a disc reproducer (not shown) and movable radially across the video disc 2. The signal pickup device 1 includes a reproducing stylus 4 movable relatively to the video disc 2 rotating in the direction of the arrow A along a track on the video disc 2 for picking up information signals therefrom.

The signal pickup device 1 has a pickup cartridge 5 (illustrated in FIG. 3) inserted in and secured to a guide member 6 which is mounted in a signal pickup device body 7. The signal pickup device 1 also includes a base plate 9 on which there are mounted a tracking control unit 10 and a jitter compensation coil 11. A coil 12 for enabling the reproducing stylus 4 to impose a stylus force on the video disc 2 is affixed to the guide member 6. The pickup cartridge 5 has a cantilever assembly 8 supporting the stylus 4 on its distal end and a metal ribbon 13 connected to the stylus 4. When the pickup cartridge 5 is mounted in position as shown in FIGS. 1 and 2, the cantilever assembly 8 is located in confronting relation to the tracking control unit 10, the jitter compensation coil 11, and the coil 12, with the metal ribbon 13 connected to a central conductor 15 of a resonator 14.

Figure 3:
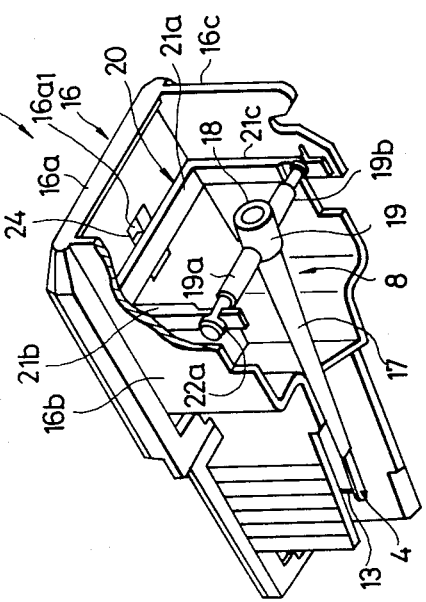
FIG. 3 is a perspective view, partly cut away, of a pickup cartridge in the signal pickup device shown in FIG. 1.
Figure 4:
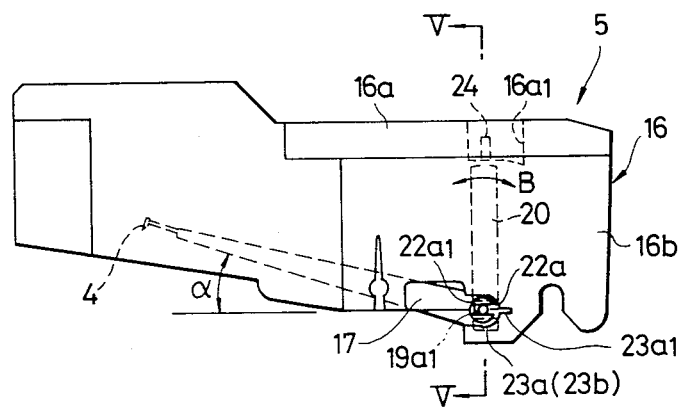
FIG. 4 is a side elevational view of the pickup cartridge illustrated in FIG. 3.
Figure 5:
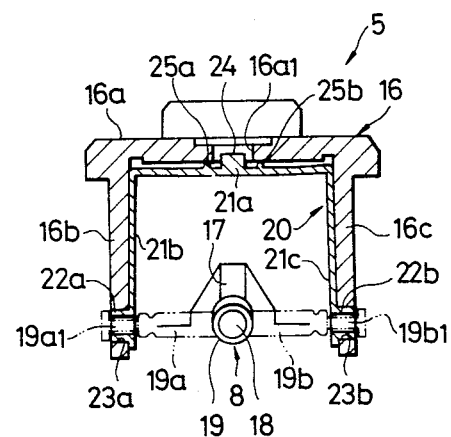
FIG. 5 is a cross-sectional view taken along line V—V of FIG. 4.

As illustrated in FIGS. 3 through 5, the pickup cartridge 5 includes a cartrige casing 16 in which the cantilever assembly 8 is housed. The cartridge casing 16 is composed of a top plate 16a and a pair of sidewalls 16b, 16c extending downwardly from both edges of the top plate 16a in laterally spaced relation. The cantilever assembly 8 comprises a tubular cantilever 17 supporting the reproducing stylus 4 on its distal end, a permanent magnet 18 forced in a proximal end of the tubular cantilever 17 remote from the stylus 4, and a suspension member 19 made of rubber attached to the proximal end of the cantilever 17. The suspension member 19 is composed of a pair of lateral arms 19a, 19b attached at their distal ends to the sidewalls 16b, 16c of the cartridge casing 16. The cantilever 17 is inclined upwardly to the left as shown in FIG. 4 so that the reproducing stylus 4 is positioned within the cartridge casing 16. With the pickup cartridge 5 mounted in the signal pickup device body 7 and positioned over the video disc 2 as shown in FIG. 2, the reproducing stylus 4 is spaced a distance h upwardly from the surface of the video disc 2 on which informaiton is recorded.

When the video disc 2 is played back with the signal pickup device 1, a predetermined amount of current flows through the coil 12 which then induces a rotative force on the permanent magnet 18 to turn conterclockwise as shown in FIG. 2 about a horizontal axis thereof. The cantilever 17 is then angularly moved counterclockwise to the position shown by the two-dot-and-dash lines in FIG. 2, twisting the arms 19a, 19b, for thereby lowering and holding the reproducing stylus 4 against the video disc 2 with a predetermined stylus force.

Regardless of the fact that the coil 12 has constant characteristics and the current flowing therethrough remains stable, the stylus force with which the reproducing stylus 4 is held against the video disc 2 tends to vary dependent on dimensional variations of the pickup cartridge 5 and variations in various properties or characteristics of the suspension member 19. Causes of such unwanted characteristic variations are considered to be variations in the magnetic force of the permanent magnet 18, the weight of the cantilever 17, the stiffness, dimension, material, degree of vulcanization of the suspension member 19, and the assembled dimension of the cartridge 5. Others may include variations in the characteristics of the coil 12 and the current flowing therethrough. The pickup cartridge 5 can be adjusted to remove various causes of such stylus force variations by determining the distance h between the reproducing stylus 4 and the disc surface, that is, an angle $\alpha$ formed between the cantilever 17 and a longitudinal axis of the cartridge casing 16 for each pickup cartridge dependent on the characteristics of the suspension member 19. For example, where the stiffness of the suspension member 19 is larger a predetermined degree, the angular movement of the cantilever 17 undergoes a larger resistance. By reducing the angle $\alpha$ of inclination of the cantilever 17 with respect to the cartridge casing 16 for an amount commensurate with an increased resistance, the reproducing stylus 4 can be held against the video disc 2 with a desired stylus force when the coil 12 is supplied with a predetermined current.

The signal pickup device according to the present invention allows adjustment of the angle $\alpha$ of inclination of the cantilever 17 through a mechanism as shown in FIGS. 6 through 9.

Figure 6:
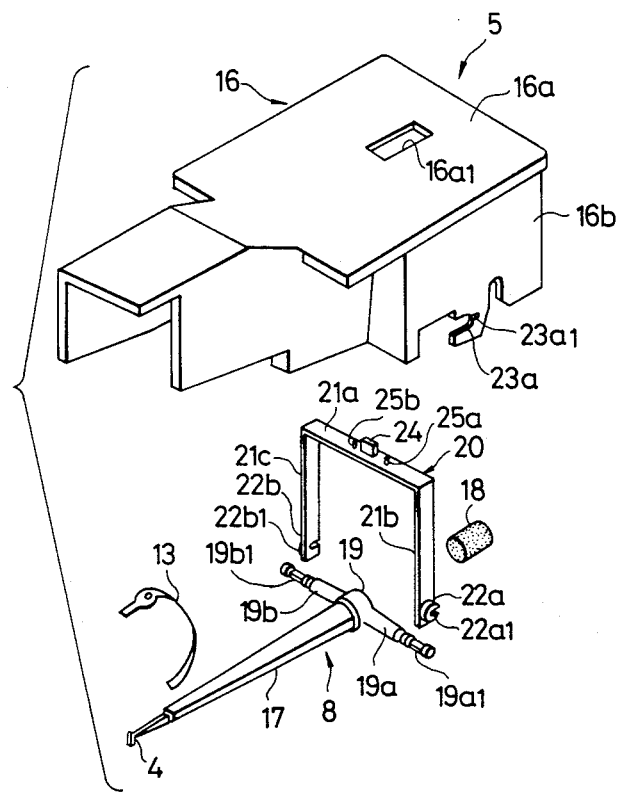
FIG. 6 is an exploded perspective view of the pickup cartridge of FIG. 3.
Figure 7:
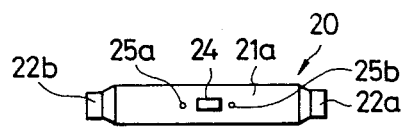
FIG. 7 is a plan view of a cantilever holder in the pickup cartridge of FIG. 6.
Figure 8:
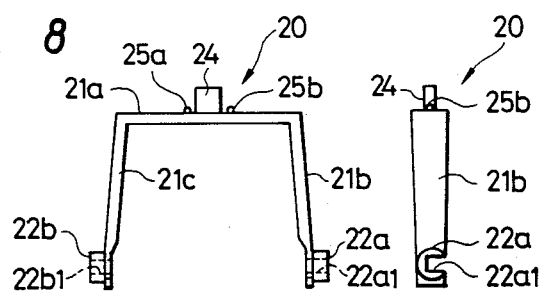
FIG. 8 is a front elevational view of the cantilever holder shown in FIG. 7.
Figure 9:
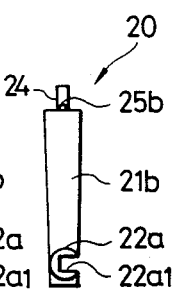
FIG. 9 is a side elevational view of the cantilever holder of FIG. 7.

The pickup cartridge 5 of FIG. 6 includes a cantilever holder 20 of an inverted U-shaped configuration comprising a horizontal beam 21a and a pair of spaced vertical arms 21b, 21c depending from ends of the beam 21a and having on distal ends thereof a pair of necks 22a, 22b, respectively, projecting away from each other and having a pair of rectangular slots $22a_1$, $22b_1$, respectively. The sidewalls 16b, 16c of the cartridge casing 16 have a pair of bearings 23a, 23b, respectively, in which the necks 22a, 22b are fitted respectively. The slots $22a_1$, $22b_1$, and the bearings 23a, 23b have one side open as shown in FIG. 6.

The arms 19a, 19b of the suspension member 19 have a pair of reduced-diameter portions $19a_1$, $19b_1$ of a rectangular cross section in complementary relation to the slots $22a_1$, $22b_1$. The cantilever assembly 8 and the cantilever holder 20 are assembled together with the reduced-diameter portions $19a_1$, $19b_1$ fitted respectively in the slots $22a_1$, $22b_1$. When the reduced-diameter portions $19a_1$, $19b_1$ are complementarily received in the slots $22a_1$, $22b_1$, the cantilever 17 is oriented in a fixed direction with respect to the cantilever holder 20. The cantilever holder 20 with the suspension member 19 thus attached is mounted in the cartridge casing 16 with the necks 22a, 22b fitted respectively in the bearings 23a, 23b, as shown in FIGS. 3 through 5. As assembled, the cantilever holder 20 can be angularly moved about the necks 22a, 22b in the direction of the arrow B with respect to the cartridge casing 16. The cantilever holder 20 has a knob 24 projecting into an opening $16a_1$ in the top plate 16a of the cartridge casing 16. The cantilever holder 20 can thus be turned about the necks 22a, 22b by moving the knob 24 back and forth in the opening $16a_1$. The bearings 23a, 23b have grooves $23a_1$ (only one shown in FIG. 6) which permit the bearings 23a, 23b to be elastically deformable to allow the necks 22a, 22b to be forced resiliently into the bearings 23a, 23b, respectively. Once the necks 22a, 22b are fitted in the bearings 23a, 23b, the necks cannot easily be removed therefrom.

The angle $\alpha$ of inclination of the cantilever 17 with respect to the longitudinal axis of the cartridge casing 16 can be changed by angularly moving the cantilever holder 20 in the direction of the arrow B as shown in FIG. 4.

In the manufacture of such cartridges 5, the cantilever holder 20 of each cartridge 5 is turned to incline the cantilever 17 at the optimum angle $\alpha$ with respect to the cartridge casing 16 for that cartridge 5. Then, the cantilever holder 20 is bonded to the cartridge casing 16. Accordingly, various cartridges 5 as they are fabricated are adjusted to compensate for causes of stylus force variations simply by setting the cantilevers 17 at desired angles $\alpha$. Any one of the cartridges 5 thus adjusted which is mounted in the signal pickup device body 7 can be held against the video disc 2 with a predetermined stylus force. The cartridges 5 as mass-produced can therefore produce equal stylus forces, which would otherwise vary from cartridge to cartridge.

The cartridge 5 can be adjusted by mounting itself in a standard signal pickup device body 7 at a final step in the manufacturing process, passing a preset current through the coil 12 turning the cantilever holder 20 with the knob 24 until a desired stylus force is produced by the reproducing stylus 4 on the video disc 2, and then bonding the cantilever holder 20 to the cartridge casing 16.

As shown in FIG. 5, the beam 21a of the cantilever holder 20 has a pair of projections 25a, 25b one on each side of the knob 24. When the cantilever holder 20 is fixedly mounted in the cartridge casing 16, the projections 25a, 25b are pressed against the top plate 16a of the cartridge casing 16 with the beam 21a curving downwardly off the top plate 16a, imposing forces to the arms 21b, 21c tending to press them against the sidewalls 16b, 16c of the cartridge casing 16. Therefore, the cantilever holder 20 is securely supported in the cartridge casing 16 with the necks 22a, 22b reliably received respectively in the bearings 23a, 23b.

Although a certain preferred embodiment of the present invention has been shown and described in detail, it should be understood that various changes and modifications may be made therein without departing from the scope of the appended claims.

What is claimed is:

1. A signal pickup device for an apparatus for playing back an information storage medium, comprising:
   (a) a body;
   (b) a cartridge casing mounted in said body;
   (c) a pickup cartridge housed in said cartridge casing and having a reproducing stylus for picking up signals from the information storage medium, a cantilever assembly composed of a cantilever supporting on one end thereof said reproducing stylus and a suspension member mounted on an opposite end of said cantilever, and a holder supporting said suspension member and attached to said cartridge casing for pivotable movement about said suspension member; and (d) means in said body for enabling said reproducing stylus to impose a stylus force on the information storage medium, whereby said holder can be adjusted in angular position through the pivotable movement about said suspension member to adjust said stylus force.

2. A signal pickup device according to claim 1, wherein said cartridge casing includes a top plate having an opening, said holder including a knob projecting into said opening and movable therein.

3. A signal pickup device according to claim 1, wherein said suspension member is composed of a pair of first arms extending away from each other, said holder comprising a beam and a pair of second arms extending from said beam in spaced relation and having a pair of necks, respectively, to which said first arms are fixedly attached, respectively, said cartridge casing having a pair of spaced sidewalls having a pair of bearings, respectively, in which said necks are angularly movably mounted.

4. A signal pickup device according to claim 3, wherein said necks have a pair of slots, respectively, of a noncircular cross section, said first arms including a pair of portions, respectively, of a noncircularly cross section, said portions being complementarily fitted in said slots, respectively.

5. A signal pickup device according to claim 4, wherein said slots have a rectangular cross section, and said portions have a rectangular cross section complementary to said first-mentioned rectangular cross section.

6. A signal pickup device according to claim 3, wherein said cartridge casing has a top plate from which said sidewalls extend, said beam having a pair of projections pressed against said top plate, said second arms being pressed against said sidewalls.

7. A signal pickup device according to claim 3, wherein said bearings have a pair of grooves, respectively, to render said bearings elastically deformable, said necks being fitted resiliently in said bearings, respectively.

8. A signal pickup device according to claim 1, wherein said holder is bonded to said cartridge casing after said holder has been adjusted in angular position with respect to said cartridge casing.

* * * * *